United States Patent [19]

Sato et al.

[11] Patent Number: 5,126,883
[45] Date of Patent: Jun. 30, 1992

[54] TELEPHOTO ZOOM LENS

[75] Inventors: Haruo Sato, Kawaguchi; Yoshinari Hamanishi, Wako, both of Japan

[73] Assignee: Nikon Corporation, Tokyo, Japan

[21] Appl. No.: 599,893

[22] Filed: Oct. 19, 1990

[30] Foreign Application Priority Data

Oct. 23, 1989 [JP] Japan .................... 1-275433

[51] Int. Cl.⁵ .................................. G02B 15/14
[52] U.S. Cl. ............................. 359/683; 359/685
[58] Field of Search ............. 350/423, 427; 359/683, 359/685

[56] References Cited

U.S. PATENT DOCUMENTS

| | | | |
|---|---|---|---|
| 4,673,258 | 6/1987 | Masumoto | 350/427 |
| 4,789,229 | 12/1988 | Yamanashi | 350/427 |
| 4,842,385 | 6/1989 | Tanaka | 350/427 |
| 4,861,145 | 8/1989 | Kikuchi | 350/427 |

FOREIGN PATENT DOCUMENTS 56-114919 9/1981 Japan .

*Primary Examiner*—Scott J. Sugarman
*Attorney, Agent, or Firm*—Shapiro and Shapiro

[57] ABSTRACT

A telephoto zoom lens, when viewed from the object, comprises: a first lens group having positive refracting power; a second lens group having negative refracting power; a third lens group having positive refracting power; a fourth lens group having positive refracting power; and a fifth lens group having negative refracting power, wherein, when magnification is varied from the wide angle end to the telephoto end, an air interval between the first lens group and the second lens group is enlarged, an air interval between the second lens group and the third lens group is reduced, an air interval between the third lens group and the fourth lens group is enlarged and an air interval between the fourth lens group and the fifth lens group is reduced.

19 Claims, 7 Drawing Sheets

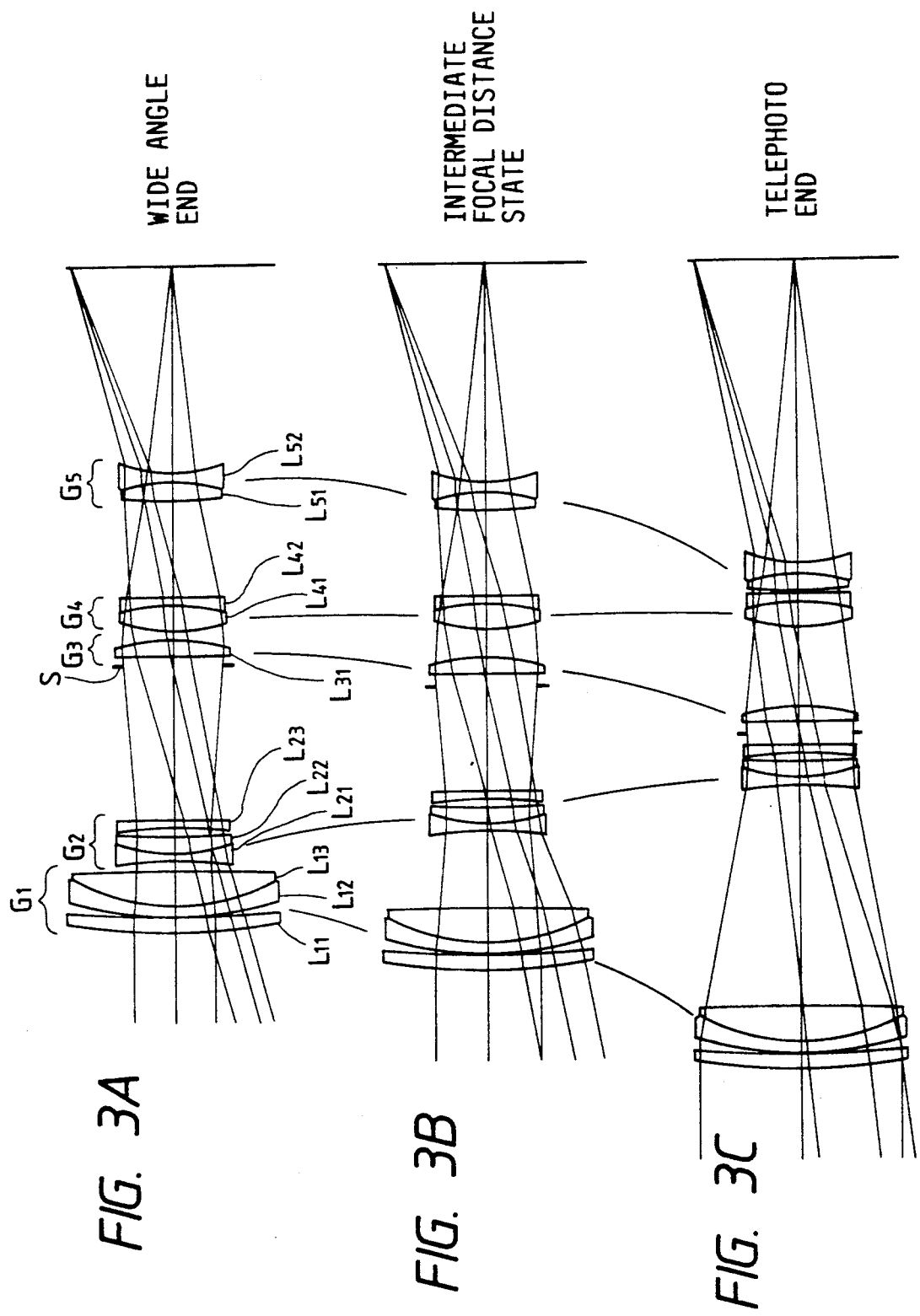

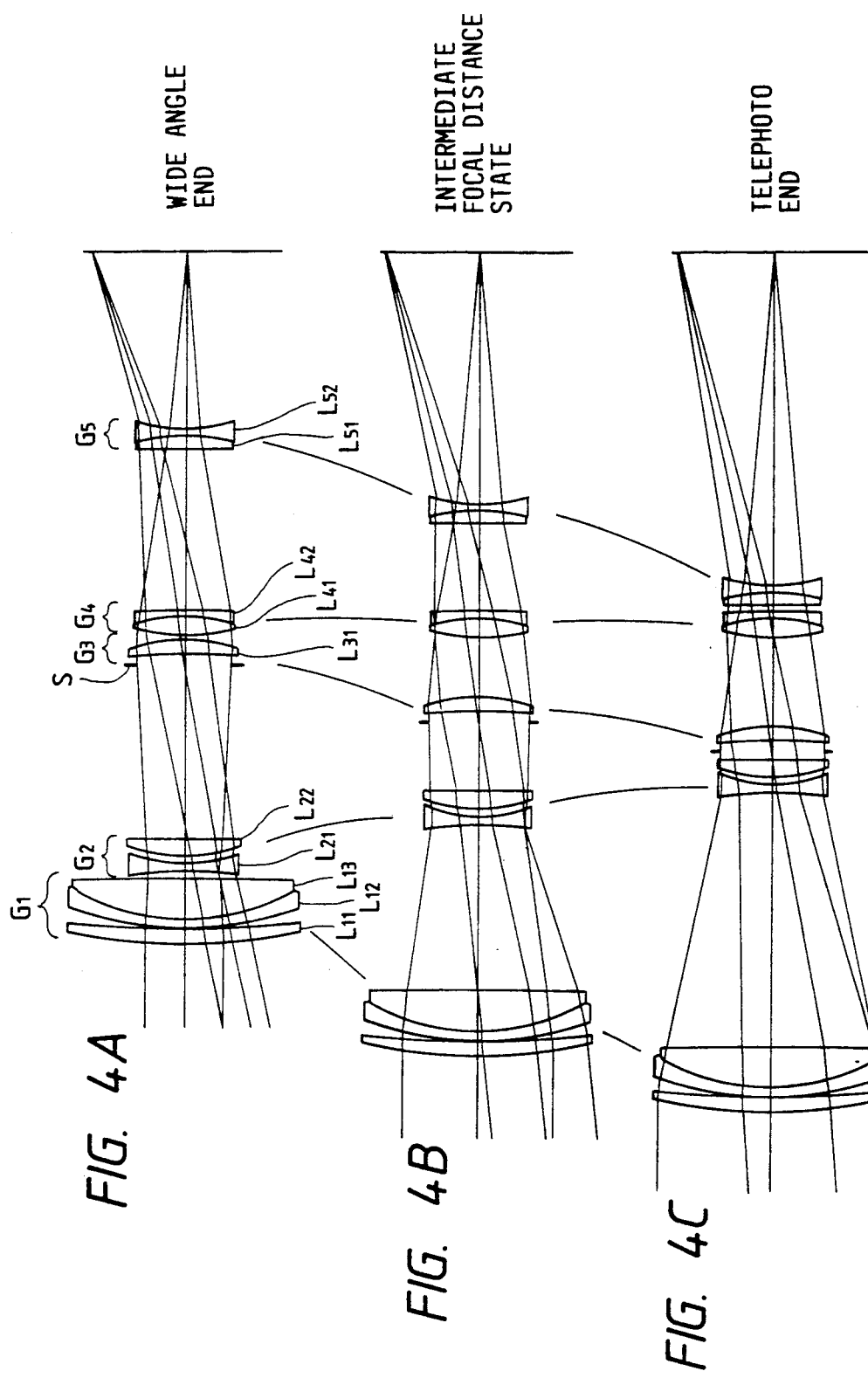

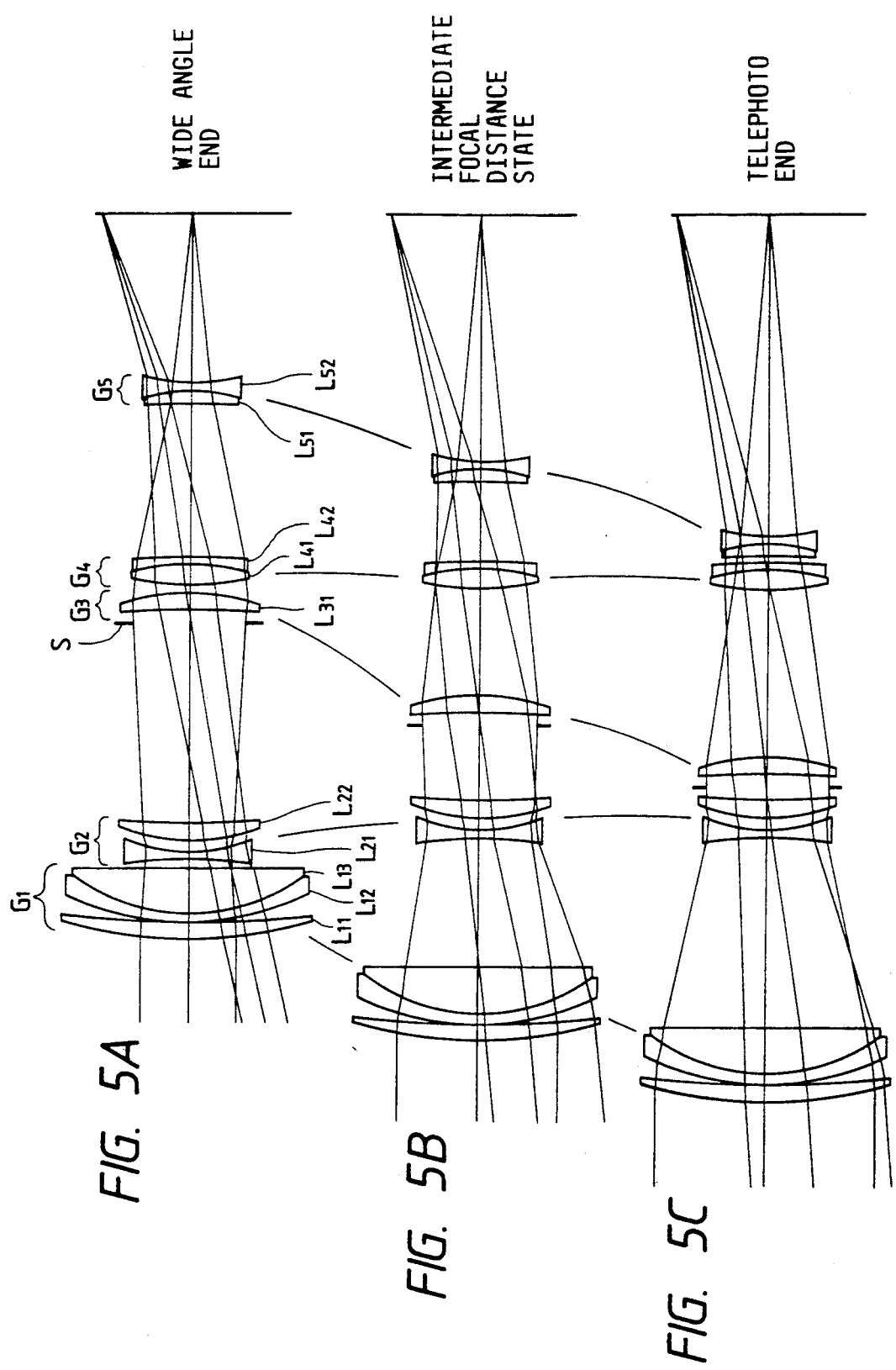

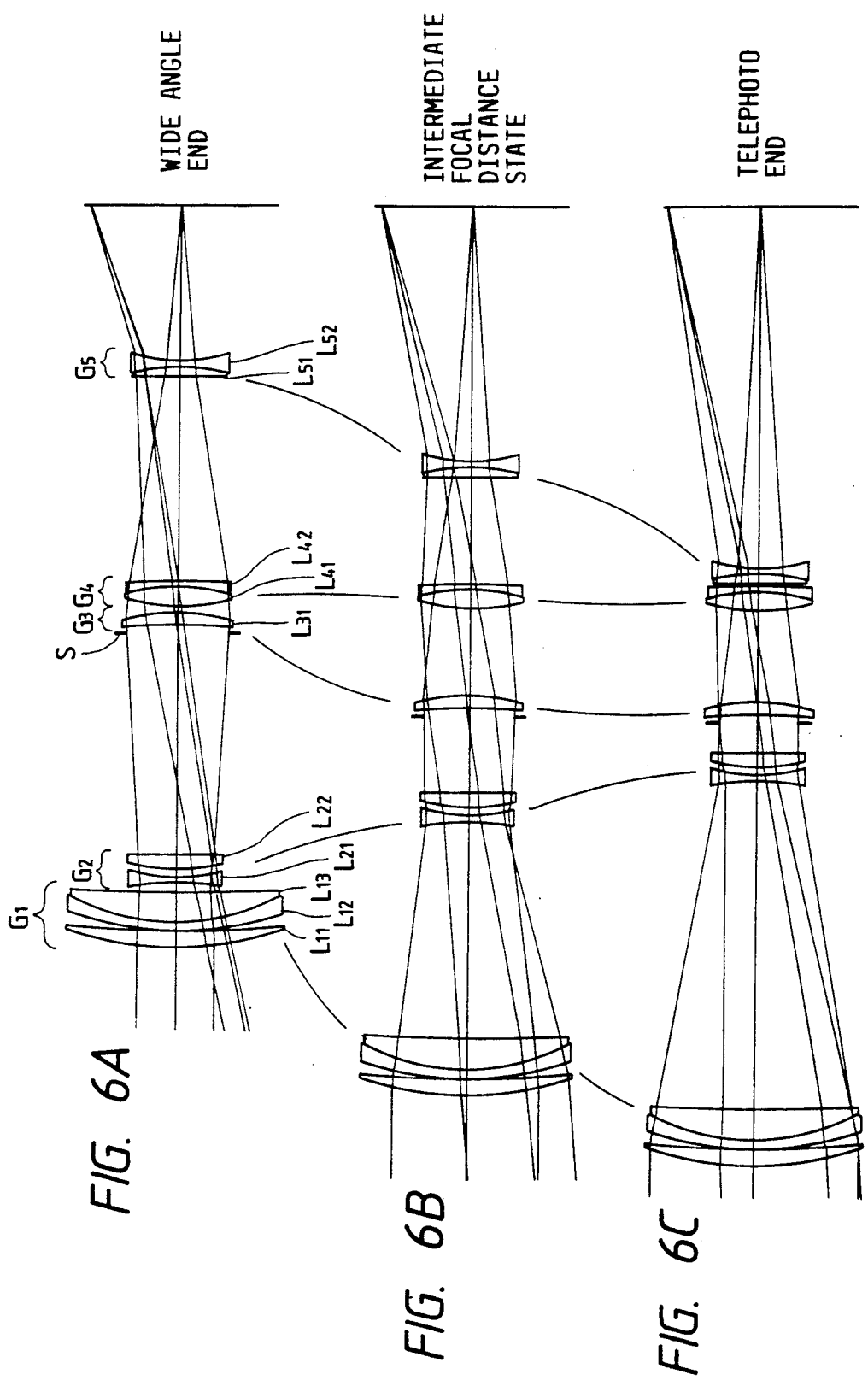

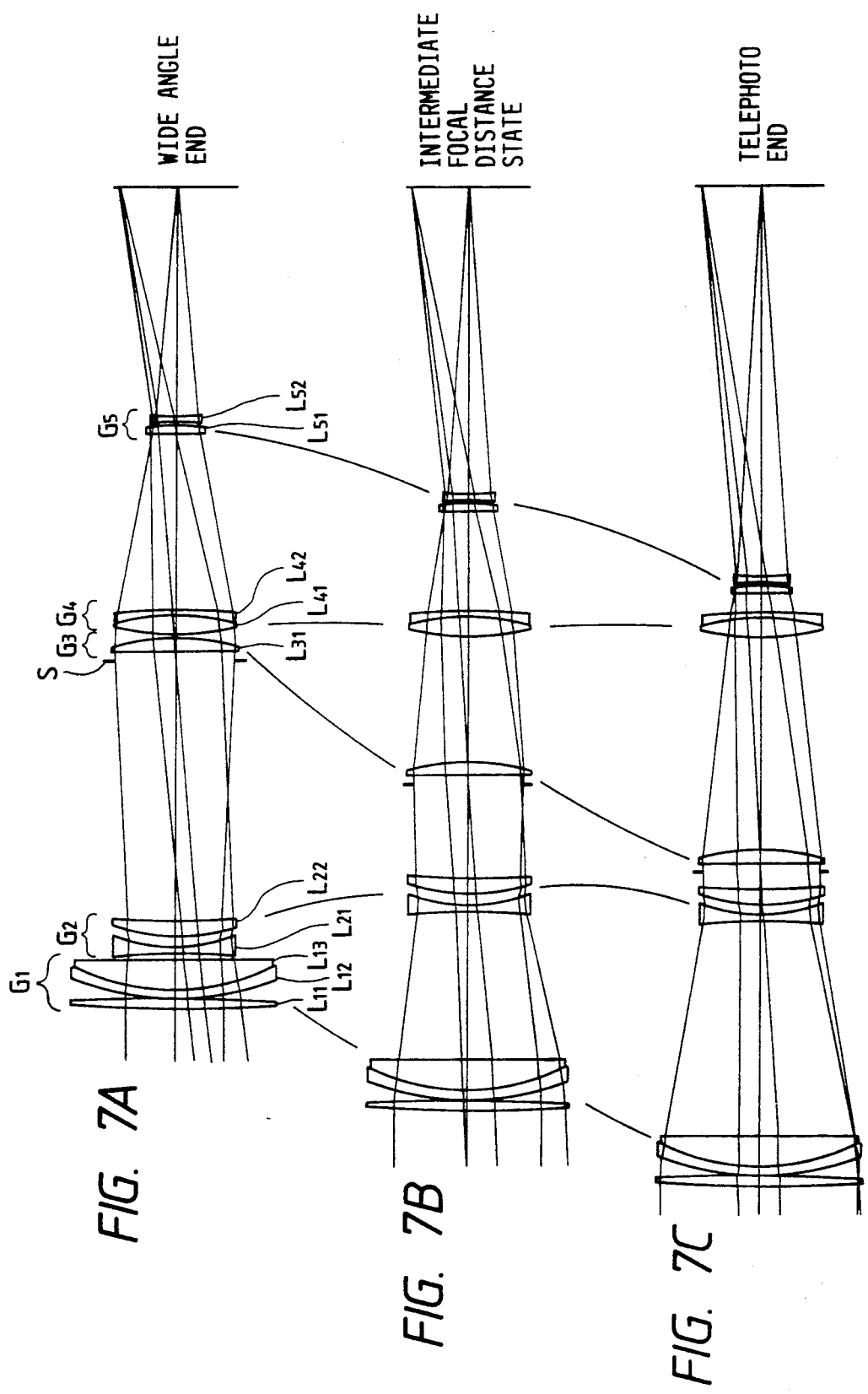

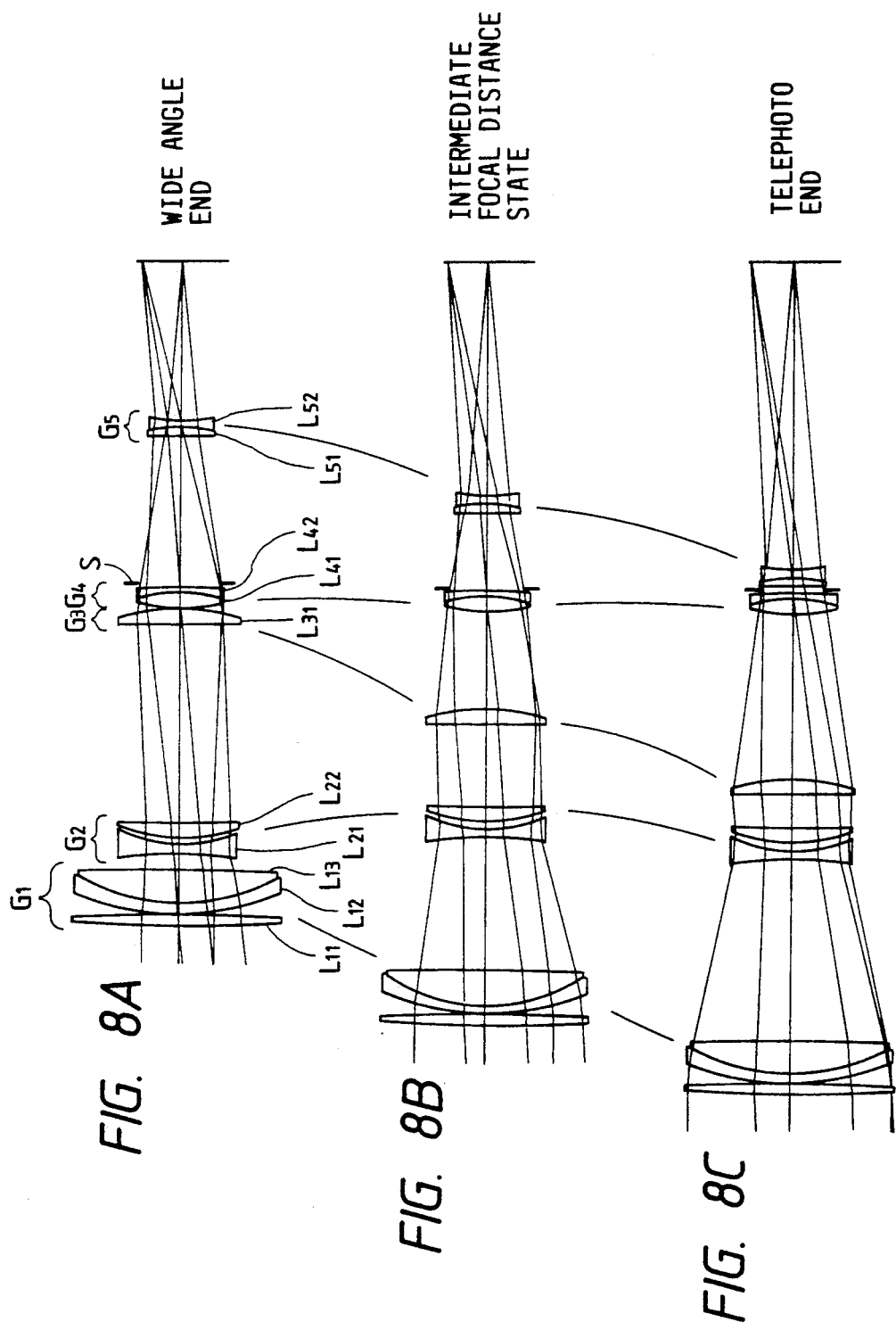

TELEPHOTO ZOOM LENS

BACKGROUND OF THE INVENTION

1. Field of the Invention

The present invention relates to a telephoto zoom lens, and, more particularly, to a telephoto zoom lens of a structure consisting of five lens groups, the telephoto zoom lens revealing a relatively compact size and reduced number of component lenses.

2. Related Background Art

Recently, there has been a desire for a telephoto lens of the type described above revealing a relatively compact size and reduced number of component lenses to have excellent imaging performance in its overall power variable region as well as revealing compact size and reduced cost with maintaining high zooming ratio. Therefore, a multiplicity of disclosures have been made, for example, in Japanese Patent Laid-Open No. 56-114919, U.S. Pat. No. 4,673,258 and the like, and have been put into practical use.

A telephoto zoom lens of an optical compensation type disclosed in the above-described Japanese Patent Laid-Open No. 56-114919 is constituted by four lens groups: a positive, a negative, a positive and a positive lens groups, that telephoto zoom lens exhibiting a characteristics in that each of the above-described lens groups has relatively weak refracting power. Therefore, the degree of freedom can be raised when the aberration is desired to be compensated so that the number of the component lenses can be reduced.

However, since a telephoto zoom lens of the type described above basically has relatively weak refractive power, the variable power ratio (zoom ratio) cannot be easily raised. If the variable power ratio is forcibly raised, the distance in which each of the lens groups must move at the time of varying the magnification becomes too long. What is even worse, another problem arises in that the overall length of the lens system becomes too long. An optical compensation type zoom lens of the type described above usually encounters the above-described problem. In particular, the reason for the fact that the telephoto zoom lens of the type described above inevitably has long overall length at its wide angle end lies in that the telephoto ratio (the overall length of the lens system/focal distance of the lens system) at the wide angle end is raised due to the basic configuration of refracting power, that is, positive, negative, positive and positive refracting power.

Therefore, it might be considered feasible to employ means arranged to enlarge the refracting power of each of the lens groups for the purpose of reducing the size of the telephoto zoom lens.

If the refracting power of each of the lens groups is enlarged, an excellent effect can be obtained in that the distance of the movement of the lens necessary at zooming (varying the magnification) can be shortened while shortening the overall length of the lens. However, freedom in compensating the aberration becomes unsatisfactory, causing the aberration variation such as the lower aberration or the spherical aberration to be undesirably increased. Accordingly, if the degree of freedom in compensating the aberration is improved by increasing the number of the component lenses, the weight of the lens system becomes too heavy and the structure becomes complicated. Therefore, the overall cost cannot be reduced.

If the overall length is shortened by arranging the structure in such a manner that each of the lens group has large refracting power, the overall length cannot satisfactorily be shortened due to the above-described distribution of the refracting power arranged as: positive, negative, positive and positive refracting power Therefore, the overall length cannot be satisfactorily shortened. If the refracting power of each of the lens groups is enlarged, the variable power ratio can be raised and the degree of freedom in compensating the aberration becomes insufficient, causing the field curvature to be varied. In particular, the upper comatic aberration is varied excessively.

The telephoto zoom lens disclosed in U.S. Pat. No. 4,673,258 is constituted by four lens groups: positive, negative, positive and negative lens groups. Furthermore, each of the lens groups is arranged to have relatively weak refracting power so that the number of the component lenses is reduced. In addition, the distribution of the refracting power of each of the lens groups is arranged in such a manner that the telephoto ratio at the wide angle end can be reduced. Therefore, the overall length of the lens system can be shortened.

However, in the case where the telephoto zoom lens in the above-described disclosure is a high magnifying power type the variable power ratio of which exceeds 2.8, the variation of the spherical aberration, the field curvature and the comatic aberration becomes too large. In particular, a lower comatic aberration is generated at the wide angle end in the positive direction, causing the symmetry of the comatic aberration to be critically distorted.

Furthermore, the telephoto zoom lens of this type is, as shown in FIG. 2, arranged in such a manner that the second lens group of the negative variable power, the third lens group of the positive variable power and the fourth lens group of the negative power are disposed very close to one another at the telephoto end. Therefore, that telephoto zoom lens is substantially constituted by two lens groups: consisting of a forward lens group having positive refracting power and composed by the first lens group; and a rearward lens group having negative refracting power and composed by the second to the fourth lens groups.

However, since each of the component lenses of the rearward lens group (the second, the third and the fourth lens groups) are arranged to act in association with one another, the degree of freedom in correcting the aberration is lowered. As a result, it is very difficult to properly and simultaneously compensate the axial aberration and the aberration deviated from the axis.

SUMMARY OF THE INVENTION

Accordingly, an object of the present invention is to provide a bright and compact telephoto zoom lens capable of overcoming the above-described problems, efficiently varying the magnification by a novel method, realizing an extra-telephoto lens and revealing excellent imaging performance over the whole variable region.

The present invention comprises, when viewed from the object, comprises: a first lens group having positive refracting power; a second lens group having positive refracting power; a fourth lens group having positive refracting power; and a fifth lens group having negative refracting power. As a result, when magnification is varied from the wide angle end to the telephoto end, an air interval between the first lens group and the second lens group is enlarged, an air interval between the second lens group and the third lens group is reduced, an air interval between the third lens group and the fourth lens group is enlarged and an air interval between the fourth lens group and the fifth lens group is reduced.

According to the present invention, the number of the component lenses can be reduced, a compact lens shape can be realized and large variable power can be realized. Furthermore, the change in the spherical aberration and the comatic aberration, the field curvature and the astigmatism due to the zooming can be compensated. In particular, the spherical aberration on the telephoto side can be significantly satisfactorily compensated. Therefore, a telephoto zoom lens revealing excellent performance can be obtained. As a result, the caliber can be enlarged, the weight of the lens system can be reduced and the overall cost of the same can be reduced.

Furthermore, according to the zooming method in compensating the aberration at the telephoto end can be maintained. Therefore, an extra-telephoto zoom lens can be easily realized.

Other and further objects, features and advantages of the invention will be appear more fully from the following description.

BRIEF DESCRIPTION OF THE DRAWINGS

FIGS. 3A, 3B and 3C illustrate the lens configuration, optical passages, the operation of each of the lens groups of the lens according to the first embodiment of the present invention;

FIGS. 4A, 4B and 4C to 6A, 6B and 6C illustrate the lens configuration, optical passages, the operation of each of the lens groups of the lens according to second to fourth embodiments of the present invention;

FIGS. 7A, 7B and 7C illustrate the lens configuration, optical passages, the operation of each of the lens groups of the lens according to a fifth embodiment of the present invention; and FIGS. 8A, 8B and 8C illustrate the lens configuration, optical passages, the operation of each of the lens groups of the lens according to sixth embodiment of the present invention.

DESCRIPTION OF THE PREFERRED EMBODIMENTS

Preferred embodiments of the present invention will now be described with reference to the drawings.

Figure 1A:
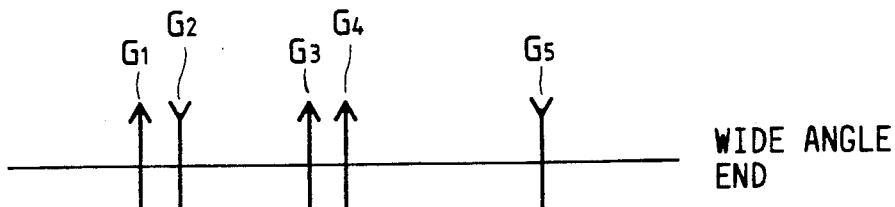
FIGS. 1A and 1B illustrate the principle of each of lens groups of an embodiment of a lens according to the present invention and constituted by five lens groups: positive, negative, positive, positive and negative refracting power.

As shown in FIG. 1A, the structure of the present invention comprises, when viewed from the object, a first lens group $G_1$ having positive refracting power, a second lens group $G_2$ having negative refracting power, a third lens group $G_3$ having positive refracting power, a fourth lens group $G_4$ having positive refracting power and a fifth lens group $G_5$ having negative refracting power. The above-described lens groups are arranged in such a manner that, when zooming from the wide angle end (see FIG. 1A) to the telephoto end is performed, the interval of air between the first lens group $G_1$ and the second lens group $G_2$ is elongated, that between the second lens group $G_2$ and the third lens group $G_3$ is shortened, that between the third lens group $G_3$ and the fourth lens group $G_4$ is elongated and that between the fourth lens group $G_4$ and the fifth lens group $G_5$ is shortened.

The above-described telephoto zoom lens according to the present invention is arranged for the purpose of improving the optical compensating type telephoto zoom lens consisting of four lens groups, that is, positive, negative, positive and positive lens groups.

The above-described lens system consisting of four lens groups reveals the characteristics in that each of the lens groups has relatively weak refracting power, the number of the component lenses can be extremely reduced, each of the lens groups can be relatively easily moved at the time of varying the magnification, the variation in the field curvature can be prevented and thereby it can be operated stably in terms of the aberration.

The above-described advantage, which is revealed in that the number of the component lens can be reduced, will effectively reduce the overall cost. Furthermore, the advantage, which is revealed in that the variation in the field curvature can be reduced, will give an effect in that the overall length of the lens can be shortened since the telephoto ratio can be lowered.

However, the telephoto zoom lens consisting of four lens groups, that is, positive, negative, positive and positive lens groups, inevitably has a relatively excessive overall length of the lens due to the above-described configuration of the refracting power components. In particular, the optical compensating type telephoto zoom lens structured basing upon the above-described refracting power configuration inevitably has a too large size with respect to the obtainable variable power ratio and the focal distance.

As shown in FIG. 1A, the telephoto lens according to the present invention is structured basing upon the five lens groups consisting of the positive, the negative, the positive, the positive and the negative lens groups. Furthermore, the first lens group $G_1$ to the fourth lens group $G_4$ serve as a master lens, while the fifth lens group $G_5$ serves as a teleconverter lens which acts to reduce the telephoto ratio.

However, the configuration of the refracting power of the first lens group $G_1$ to the fourth lens group $G_4$ serving as the master lens is, similarly to the above-described optical compensating type telephoto zoom lens, arranged to have the respective refracting power arranged positive, negative, positive and positive refracting power. Therefore, the overall length of the lens cannot be satisfactorily reduced. It might therefore be considered feasible to employ a means for reducing the overall length of the lens by considerably groups. However, it leads to an undesirable fact that the comatic aberration and the spherical aberration varies excessively.

Therefore, according to the present invention, the refracting power of the first lens group $G_1$ and that of the second lens group $G_2$ are respectively and relatively weakened, while that of the third lens group $G_3$ and that of the fourth lens group $G_4$ are strengthened to a certain degree. As a result, the synthesized focal distance from the first lens group $G_1$ to the fourth lens group $G_4$ is relatively shortened while preventing the deterioration in aberration. As a result, the overall length of the lens can be relatively shortened. Furthermore, the fifth lens group $G_5$ having negative refracting power is disposed behind the fourth lens group $G_4$ so that the telephoto ratio is reduced. As a result, the overall length of the lens is shortened.

The zoom lens consisting of four lens groups, that is, the positive, the negative, the positive and the positive lens group easily generates a negative distorted aberration at the wide angle end. However, the structure according to present invention further comprising the fifth lens group $G_5$ having negative refracting power is able to generate a positive distorted aberration so that the distorted aberration can be satisfactorily compensated. Furthermore, as shown in FIG. 1, since the fifth lens group $G_5$ is moved toward the object at the time of the zooming operation performed from the wide angle end to the telephoto end, the positive distorted aberration generated at the telephoto end can be reduced. Therefore, the variation in the distorted aberration due to the zooming operation can be prevented. Therefore, the diameter of the lens of the fifth lens group $G_5$ can be reduced thanks to the above-described way of the movement of the lens group. Furthermore, the beam capable of generating the upper comatic aberration can be sufficiently shielded.

In order to achieve the excellent aberration compensating function while exhibiting the reduced number of the component lens of each of the lens groups and revealing satisfactory high magnifying ratio, the above-described proper configuration of the refracting power and the proper lens shape are necessary. Furthermore, it is necessary to perform the most suitable manner of moving each of the lens groups at the time of varying the magnifying power, that is, to employ the most suitable method of varying the magnification.

As described above, the conventional method of varying the magnification of the zoom lens consisting of four groups respectively having the positive, the negative, the positive and the negative refracting power disclosed in U.S. Pat. No. 4,673,258 is, as shown in FIG. 2, constituted by two lens groups at its telephoto end, that is, a forward lens group $G_F$ (a first lens group $G_{1P}$) having positive refracting power and a rearward lens group $G_R$ (a second lens group $G_{2P}$ to a fourth lens group $G_{4P}$) having negative refracting power.

In general, it is effective for the axial aberration to be compensated by a lens positioned at which the incidental height of a beam on the axis is extended. On the other hand, the aberration outside the axis can be effective compensated by a lens positioned at which the beam on the axis and the beam outside the axis are separated from each other. Therefore, it is very difficult to simultaneously compensate the axial aberration and the aberration outside the axis. That is, it can be understood that the axial aberration and the aberration outside the axis cannot be easily simultaneously compensated by a lens group in which the number of the component lenses is reduced.

As shown in FIG. 2, according to the method of varying the magnification disclosed in U.S. Pat. No. 4,673,258, the function of compensating the axial aberration and the aberration outside the axis arranged to be performed by the second lens group $G_{2P}$ to the fourth lens group $G_{4P}$ disposed away from each other at the wide angle end is excessively deteriorated when the second lens group $G_{2P}$ to the fourth lens group $G_{4P}$ (the rearward lens group $G_R$ having negative refracting power) come closer to each other until they are integrated at the telephoto end. That is, the integrated second lens group $G_{2P}$ to the fourth lens group $G_{4P}$ of the rearward lens group $G_R$ which have been integrally positioned must simultaneously compensate the axial aberration and the aberration outside the axis at the position at which the axial beam and the beam outside the axis are not perfectly separated from each other. Therefore, the obtainable imaging performance becomes unsatisfactory in the case where the rearward lens group $G_5$ (the second lens group $G_{2P}$ to the fourth lens group $G_{4P}$) is arranged in such a manner that the number of the component lenses is reduced.

Figure 2A:
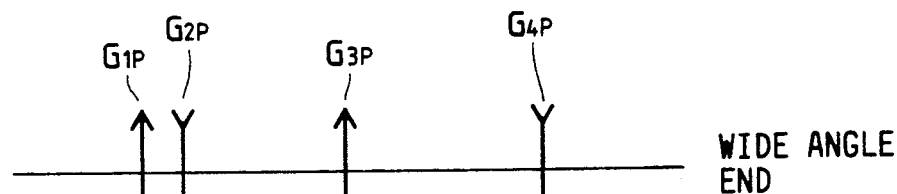
FIGS. 2A and 2B illustrate the operation of each of lens groups of a conventional telephoto zoom lens constituted by four lens groups: positive, negative, positive and negative refracting power.
Figure 2B:

Specifically, according to the method of varying the magnification shown in FIGS. 2A and 2B, the axial aberration such as a spherical aberration which arises a critical problem at a telephoto end (B) must be mainly compensated by the first lens group $G_{1P}$ of the forward lens group $G_F$ at which the incidental height of the land beam (a beam emitted at an infinite axis and made incident upon the outermost periphery of the lens) is extended. If the spherical aberration is mainly compensated by the first lens group $G_{1P}$ of the forward lens group $G_F$, the degree of freedom for compensating the field curvature, an astigmatism and the lower comatic aberration which are the aberrations outside the axis becomes excessively deteriorated. In particular, since the lower beams of the beams outside the axis from the maximum angle of view pass through the outermost portion of the lens in the first lens group $G_{1P}$ of the forward lens group $G_F$, the quantity of the lower comatic aberration generated at that portion is able to become largest in overall system.

If the spherical aberration as the aberration outside the axis is mainly compensated by the first lens group $G_{1P}$ of the forward lens group $G_F$, the degree of freedom for compensating the variation in the lower comatic aberration will be excessively deteriorated. Therefore, the rearward lens group $G_R$ (the second lens group $G_{2P}$ to the fourth lens group $G_{4P}$) must bear the load necessary to compensate the spherical aberration as the aberration outside the axis in order to satisfactorily compensate the aberration.

However, according to the above-described method of varying the magnification, since the second lens group $G_{2P}$ to the fourth lens group $G_{4P}$ constituting the rearward lens group $G_R$ are brought to be integrated, it is very difficult to simultaneously compensate the axial aberration and the aberration outside the axis while preventing an increase in the number of the component lenses in that rearward lens group $G_R$.

On the contrary, according to the method of varying the magnification of a telephoto zoom lens according to the present invention, the magnification can be effectively varied at the time of the zooming operation performed, as shown in FIG. 1, from the wide angle end (A) to the telephoto end (B) in such a manner that the air interval between the second lens group $G_2$ and the third lens group $G_3$ is shortened while that between the first lens group $G_1$ and the second lens group $G_2$ is elongated. Furthermore, the air interval between the fourth lens group $G_4$ and the fifth lens group $G_5$ is shortened while that between the third lens group $G_3$ and the fourth lens group $G_4$ is elongated. The second lens group $G_2$ and the second lens group $G_3$ are integrated at the telephoto end (B), while the fourth lens group $G_4$ and the fifth lens group $G_5$ are integrated at the same position. As a result, the structure is substantially composed by three lens groups consisting of a forward lens group $G_F$ (the first lens group $G_1$) having positive refracting power, an intermediate lens group $G_M$ (the second lens group $G_2$ and the third lens group $G_3$) having negative refracting power and a rearward lens group $G_R$ (the fourth lens group $G_4$ and the fifth lens group $G_5$) having negative refracting power.

The land beam at the wide angle end (see FIG. 1A) of the zoom lens according to the present invention becomes highest in the vicinity of the fourth lens group $G_4$ and it passes through the outermost periphery of each of the lenses of the fourth lens group $G_4$. Therefore, the most satisfactory effect of compensating the spherical aberration can be obtained.

In order to improve the compensation effect to the maximum degree, it is necessary to improve the degree of freedom in compensating the spherical aberration by increasing the number of the component lenses. According to the present invention, the third lens group $G_3$ and the fourth lens group $G_4$ are caused to come closer at the wide angle end. Therefore, the degree of freedom in compensating the spherical aberration can substantially be improved while reducing the number of the component lenses. Therefore, the fourth lens group $G_4$ is able to reveal relatively large refracting power while reducing the number of the component lenses. Furthermore, satisfactory brightness can be significantly effectively maintained due to the above-described lens configuration.

Figure 1B:
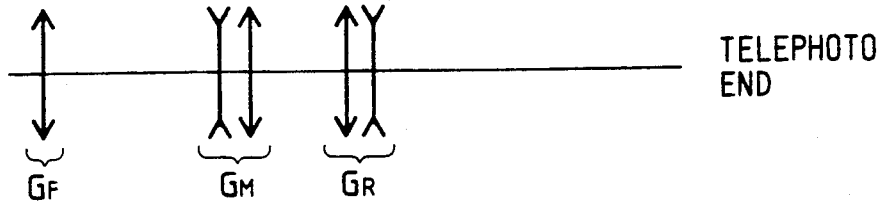

As shown in FIGS. 1A and 1B, when the zooming operation is performed from the wide angle end (see FIG. 1A) to the telephoto end (FIG. 1B), the land beam passes through the outermost periphery of the intermediate lens group BM (the second lens group $G_2$ and the third lens group $G_3$) having negative refracting power. Furthermore, the beams outside the axis pass through the central portion of each of the lenses of the intermediate lens group $G_M$. Therefore, the spherical aberration can be properly compensated while preventing undesirable influence on the aberration outside the axis. That is, as described in the first to fifth embodiments, the compensation can be performed by the arrangement of the diaphragms.

Therefore, the load necessary to compensate the spherical aberration can be significantly reduced in the first lens group $G_1$ of the forward lens group $G_F$ having positive refracting power positioned closer than the intermediate lens group $G_M$ having negative refractive power. As a result, the degree of freedom in compensating the aberrations outside the axis such as the lower comatic aberration, the field curvature and the astigmatism can be improved. Therefore, the above-described aberrations outside the axis can be satisfactorily compensated.

In the rearward lens group (the fourth lens group $G_4$ and the fifth lens group $G_5$) having negative refracting power positioned closer to the image than the intermediate lens group $G_M$ having negative refracting power, axial beams pass through the central region of that lens group $G_R$, while the beam outside the axis pass through the peripheral portion of that lens group. Therefore, the two beams are satisfactorily separated from each other. As a result, the degree of freedom in compensating the upper comatic aberration, the field curvature and astigmatism can be improved. Therefore, the above-described aberrations outside the axis can be properly compensated.

As described above, according to the method of varying the magnification according to the present invention, a substantially three lens groups consisting of a positive, a negative and a negative lens group are formed at the telephoto end (B). As a result, the function of each of the lens groups can be clearly divided into a function of compensating the axial aberration and that of compensating the aberration outside the axis. Therefore, the degree of freedom in compensating the aberration can be improved.

In the case of realizing an extra-telephoto zoom lens revealing an excellent performance of varying the magnification while having the lens in the rearward lens group the diameter of which is reduced and revealing a reduced size, a structure may be employed in which the diaphragm is, like a sixth embodiment, disposed in the vicinity of the rearward lens group $G_R$ (the fourth lens group and the fifth lens group) having negative refracting power or in that rearward lens group $G_R$. Since the extra-telephoto zoom lens thus constituted has an extremely narrow field angle, the forward lens group $G_F$, the intermediate lens group $G_M$ and the rearward lens group $G_R$ is able to perform the above-described aberration compensation operations even if the position of the diaphragm is changed. Therefore, in this case, the functions of compensating the aberrations can be properly allotted to the lens groups at each of the magnification states. As a result, excellent imaging performance can be achieved.

As disclosed in U.S. Pat. No. 4,673,258, according to the method of varying the magnification shown in FIGS. 2A and 2B, the structure is arranged in such a manner that the telephoto end B is constituted by two lens groups consisting of the positive refracting power lens group and a negative refracting power lens group. Therefore, if the refracting power of the rearward lens group $G_R$ having negative lens power is strengthened, the telephoto ratio of that lens system can usually be reduced and the overall size can thereby reduced. Furthermore, the distance of movement necessary for varying the magnification can be shortened. However, various aberrations are excessively generated, causing the imaging performance to be deteriorated. Therefore, the number of the component lenses must be increased, causing the overall cost to be increased.

However, according to the method of varying the magnification according to the present invention shown in FIGS. 1A and 1B, the telephoto ratio at the telephoto end can be determined by the synthesized refracting power of the refracting power (the synthesized refracting power of the second lens group $G_2$ and the third lens group $G_3$ at the telephoto end) of the intermediate lens group $G_M$ having negative refracting power and that (the synthesized refracting power of the fourth lens group $G_4$ and the fifth lens group $G_5$ at the telephoto end) of the rearward lens group $G_R$ having negative refracting power. That is, it can be determined by the synthesized refracting power of the second lens group $G_2$ to fifth lens group $G_5$ at the telephoto end.

It is assumed that the synthesized focal distance (the synthesized focal distance of the second lens group $G_2$ to the fifth lens group $G_5$ at the telephoto end) of the intermediate lens group $G_M$ having negative refracting power and the rearward lens group $G_R$ having negative refracting power at the telephoto end (see FIGS. 1B) is $f_{25}$. Furthermore, it is assumed that the focal distance of the intermediate lens group $G_M$ (the synthesized focal distance of the second lens group $G_2$ and the third lens group $G_3$ at the telephoto end) having negative refracting power at the telephoto end is $f_{23}$. In addition, it is assumed that the focal distance of the rearward lens group $G_R$ (the synthesized focal distance of the fourth lens group $G_4$ and the fifth lens group $G_5$ at the telephoto end) having negative refracting power at the telephoto end is $f_{45}$. Furthermore, it is assumed that the distance between the principal points of the intermediate lens group $G_M$ having negative refracting refracting power at the telephoto end is D. The following relationships are held:

$$\frac{1}{f_{25}} = \frac{1}{f_{23}} + \frac{1}{f_{45}} - \frac{D}{f_{23} \cdot f_{45}}$$

where $f_{25}<0, f_{23}<0, f_{45}<0, D<0$, $1/f_{25}$ denotes the synthesized refracting power of the intermediate lens group $G_M$ having negative refracting power and the rearward lens group $G_R$ having negative refracting power, $1/f_{23}$ denotes the refracting power of the intermediate lens group $G_M$ having negative refracting power and $1/f_{45}$ denotes the refracting power of the rearward lens group $G_R$ having negative refracting power.

From the above-described relationship expressed by Equation, it can be understood that the synthesized refracting power of the intermediate lens group $G_M$ having negative refracting power and the rearward lens group $G_R$ having negative refracting power can be strengthened while preventing the refracting power of the intermediate lens group $G_M$ having negative refracting power and the rearward lens group $G_R$ having negative refracting power by enlarging the interval D between the principles points of the intermediate lens group $G_M$ having negative refracting power and the rearward lens group $G_R$ having negative refracting power, that is, by enlarging the air interval between the intermediate lens group $G_M$ having negative refracting power and the rearward lens group $G_R$ having negative refracting power adjacent to the telephoto end.

Therefore, an excellent aberration compensation effect can be obtained and the overall cost can be reduced even if the number of the lenses constituting the intermediate lens group $G_M$ having negative refracting power and the rearward lens group $G_R$ having negative refracting power is reduced.

Furthermore, according to the method of varying the magnification according to the present invention, since the telephoto ratio can be reduced at the telephoto end, the necessary distance of movement at the time of varying the magnification can be shortened. In addition, the interval between the third lens group $G_3$ and the fourth lens group $G_4$ can be reduced at the wide angle end. Therefore, the overall size of the lens system can be reduced.

As described above, according to the method of varying the magnification according to the present invention, the degree of freedom in compensating aberrations at the telephoto end can be improved. Therefore, the variable power ratio can be raised, the caliber can be enlarged, an extra-telephoto zoom lens can be realized, and the overall cost and size can be reduced.

As described above, the following condition (1) must be satisfied in order to obtain a satisfactory effect from the method of varying the magnification according to the present invention by maintaining the independence of the function of compensating the axial aberration performed by the intermediate lens group $G_M$ (the second lens group $G_2$ and the third lens group $G_3$) and the function of compensating the aberration outside the axis performed by the rearward lens group $G_R$ (the fourth lens group $G_4$ and the fifth lens group $G_5$) at the telephoto end. Furthermore, the synthesized refracting power of the intermediate lens group $G_M$ having negative refracting power and that of the rearward lens group $G_R$ having negative refracting power are enlarged while weakening the refracting power of the intermediate lens group $G_M$ having negative refracting power and that of the rearward lens group $G_R$ having negative refracting power.

It is assumed that the focal distance of the overall system at the wide angle end (A) is $f_W$. Furthermore, it is assumed that the air interval (distance between apexes) from the apex of the lens surface of the third lens group $G_3$ which is most adjacent to the image at the telephoto end to the apex of the lens surface of the fourth lens group $G_4$ which is most adjacent to the object is $D_{3T}$. In addition, it is assumed that the air interval (distance between apexes) from the apex of the lens surface of the third lens group $G_3$ which is most adjacent to the image at the wide angle end to the apex of the lens surface of the fourth lens group $G_4$ which is most adjacent to the object is $D_{3W}$.

It is preferable that the following relationships be met:

$$0 < \frac{D_{3T} - D_{3W}}{f_W} \leq 2 \qquad (1)$$

The above-described condition (1) defines the quantity of change of the most suitable air interval between the third lens group $G_3$ and the fourth lens group $G_4$ which is changed due to the zooming operation performed from the wide angle end (FIG. 1A) to the telephoto end (FIG. 1B). That is, the air interval between the third lens group $G_3$ and the fourth lens group $G_4$ is properly enlarged at the time of the zooming operation performed from the wide angle end to the telephoto end. As a result, a proper state of separation is defined between the intermediate lens group $G_M$ (the second lens group $G_2$ and the third lens group $G_3$) having negative refracting power and the rearward lens group $G_R$ (the fourth lens group $G_4$ and the fifth lens group $G_5$) having negative refracting power at the telephoto end.

If the condition exceeds the lower limit of condition (1), the interval between the third lens group $G_3$ and the fourth lens group $G_4$ is reduced at the telephoto end (FIG. 2B), causing the degree of freedom in compensating the aberration to be deteriorated. Therefore, the independence of the functions of compensating the aberrations respectively performed by the intermediate lens group $G_M$ (the second lens group $G_2$ and the third lens group $G_3$) having negative refracting power and the rearward lens group $G_R$ (the fourth lens group $G_4$ and the fifth lens group $G_5$) having negative refracting power at the telephoto end is lost. As a result, it becomes difficult to obtain excellent imaging performance. What is even worse, the variation in the lower comatic aberration cannot be easily compensated at this time and the a high zoom ratio cannot be realized. Therefore, if the number of the component lenses is increased in order to improve the degree of freedom in compensating the aberration, the size of the lens is undesirably enlarged and the overall cost is also undesirably raised. If the condition exceeds the upper limit of condition (1), the interval between the third lens group $G_3$ and to the zooming operation performed from the wide angle end (FIG. 1A) to the telephoto end (FIG. 1B).

Therefore, the overall size of the lens system becomes too large due to the enlargement of the interval between the two lens groups.

It is assumed that the synthesized focal distance from the second lens group $G_2$ to the third lens group $G_3$ at the telephoto end (FIG. 1B) is $f_{23}$. Furthermore, it is assumed that the synthesized focal distance from the fourth lens group $G_4$ to the fifth lens group $G_5$ at the telephoto end is $f_{45}$. In addition, it is assumed that the synthesized focal distance of the second lens group $G_2$, the third lens group $G_3$, the fourth lens group $G_4$ and the fifth lens group $G_5$ at the telephoto end is $f_{25}$. In this state, it is preferable that the following conditions be met:

$$1 < \frac{f_{23}}{f_{25}} \leq 15, f_{23} < 0, f_{25} < 0 \quad (2)$$

$$1 < \frac{f_{45}}{f_{25}} \leq 10, f_{45} < 0, f_{25} < 0 \quad (3)$$

Then, conditions (2) and (3) will be described.

In order to obtain the satisfactory effect from the method of varying the magnification according to the present invention as described about Equation, it is necessary to properly distribute the refracting power of the intermediate lens group $G_M$ having negative refracting power and constituted by the second lens group $G_2$ and the third lens group $G_3$ and that of the rearward lens group $G_R$ having negative refracting power and constituted by the fourth lens group $G_4$ and the fifth lens group $G_5$. That is, it is necessary to determine the proper region for the synthesized focal distance of the second lens group $G_2$ and the third lens group $G_3$ which constitute the intermediate lens group $G_M$ having negative refracting power at the telephoto end and the fourth lens group $G_4$ and the fifth lens group $G_5$ which constitute the rearward lens group $G_R$ having negative refracting power.

Therefore, according to the present invention, condition (2) defines the most suitable ratio of the focal distance $f_{23}$ (the synthesized focal distance of the second lens group $G_2$ and the third lens group $G_3$ at the telephoto end) with respect to the synthesized focal distance $f_{25}$ (the synthesized focal distance from the second lens group $G_2$ to the fifth lens group $G_5$ at the telephoto end) of the intermediate lens group $G_M$ having negative refracting power and the rearward lens group $G_R$ having negative refracting power. Furthermore, condition (3) determines the most suitable ratio of the focal distance $f_{45}$ (the synthesized focal distance of the second fourth lens group $G_4$ and the fifth lens group $G_5$ at the telephoto end) with respect to the synthesized focal distance $f_{25}$ (the synthesized focal distance from the second lens group $G_2$ to the fifth lens group $G_5$ at the telephoto end) of the intermediate lens group $G_M$ having negative refracting power and the rearward lens group $G_R$ having negative refracting power. That is, condition (2) shows the relationship between the intermediate lens group $G_M$ having negative refracting power with respect to the telephoto ratio at the telephoto end (FIG. 1B). Condition (3) shows the relationship between the rearward lens group $G_R$ having negative refracting power with respect to the telephoto ratio at the telephoto end (FIG. 1B).

If the condition exceeds the lower limit of condition (2), the focal distance of the intermediate lens group $G_M$ having negative refracting power becomes smaller with respect to the synthesized focal distance of the intermediate lens group $G_M$ having negative refracting power and the rearward lens group $G_R$ having negative refracting power. At this time, the spherical aberration is excessively compensated, causing the imaging performance to be critically deteriorated. If the condition exceeds the upper limit of condition (2), the focal distance of the intermediate lens group $G_M$ having negative refracting power becomes larger with respect to the synthesized focal distance of the intermediate lens group $G_M$ having negative refracting power and the rearward lens group $G_R$ having negative refracting power. As a result, the spherical aberration cannot be compensated satisfactorily, causing the imaging performance to be critically deteriorated. If the value of the upper limit of condition (2) is arranged to be 10 and the structure is arranged so as to meet the above-described range, a telephoto zoom lens having proper aberrations at the telephoto end can be realized.

If the condition exceeds the lower limit of condition (3), the focal distance of the rearward lens group $G_R$ having negative refracting power becomes smaller with respect to the synthesized focal distance of the intermediate lens group $G_M$ having negative refracting power and the rearward lens group $G_R$ having negative refracting power. As a result, the positive distorted aberration becomes too large. What is even worse, the value of the Petzval's sum takes a large negative value, causing the field curvature and the astigmatism to be excessively generated. If the condition exceeds the upper limit of condition (3), the focal distance of the rearward lens group $G_R$ having negative refracting power becomes larger with respect to the synthesized focal distance of the intermediate lens group $G_M$ having negative refracting power and the rearward lens group $G_R$ having negative refracting power. As a result, the overall length becomes undesirably elongated. Therefore, the overall size cannot be reduced. If the value of the upper limit of condition (3) is arranged to be 7 and the structure is arranged so as to meet the above-described range, a telephoto zoom lens having proper aberrations at the telephoto end can be realized.

In order to perform the satisfactory aberration compensation, the refracting power distribution of each of the lens groups must be properly made. In particular, it is preferable that the following conditions be met:

$$0.7 \leq \frac{f_3}{f_W} \leq 1.5 \quad (4)$$

$$0.6 \leq \frac{f_4}{f_W} \leq 1.5 \quad (5)$$

$$-1.1 \leq \frac{f_5}{f_W} \leq -0.2 \quad (6)$$

where $f_W$: the focal distance of overall system at the wide angle end (FIG. 1A)

$f_3$ the focal distance of the third lens group $G_3$ $f_4$ the focal distance of the fourth lens group $G_4$ $f_5$ the focal distance of the fifth lens group $G_5$ Conditions (4) and (5) respectively define the most suitable focal distance range of the third lens group $G_3$ and the fourth lens group $G_4$. If the condition exceeds the lower limit of condition (4) and that of condition (5), the spherical aberration cannot be compensated satisfactorily and the Petzval's sum takes a large positive value. As a result, the astigmatism and the field curvature are generated excessively. If the condition exceeds the upper limit of condition (4) and that of condition (5), the spherical aberration is excessively compensated and the Petzval's sum takes a large negative value. As a result, the astigmatism and the field curvature are generated excessively.

If the upper limit and the lower limit of the condition (5) are determined as follows, the aberrations, such as the spherical aberration, the astigmatism and the field curvature can be further significantly compensated:

$$0.89 \leq \frac{f_4}{f_W} \leq 1.08 \tag{5}'$$

Condition (6) defines the most suitable focal distance range of the fifth lens group having negative refracting power. If the condition exceeds the lower limit of condition (6), the negative refracting power of the fifth lens group $G_5$ becomes weaken, causing the fourth lens group $G_4$ and the fifth lens group $G_5$ to be mechanically brought into contact with each other at the telephoto end (1B). Therefore, a desired high zoom ratio cannot easily be achieved. If the interval between the fourth lens group $G_4$ and the fifth lens group $G_5$ is maintained, the overall size of the lens system becomes undesirably too large. If the condition exceeds the upper limit of condition (6), the negative refracting power of the fifth lens group $G_5$ becomes strong, the overall size can be reduced. However, it is very difficult to maintain back focus. Therefore, a single-lens reflex camera, an electronic camera and a TV camera cannot employ that structure since they must have a certain back focus. What is even worse, the distorted aberration is excessively shifted in the direction of the positive values, causing the Petzval's sum takes a large negative value. As a result, the astigmatism and the field curvature critically deteriorated and, in particular, the change in the field curvature becomes excessively large due to the zooming operation.

Assuming that the focal distance of the first lens group $G_1$ is $f_1$ and the focal distance of the second lens group $G_2$ is $f_2$, it is preferable that the following conditions be met:

$$0.6 \leq \frac{f_1}{f_W} \leq 1.9 \tag{7}$$

$$-0.9 \leq \frac{f_2}{f_W} \leq -0.4 \tag{8}$$

If the condition exceeds the lower limit of condition (7), the spherical aberration cannot be compensated satisfactorily. Simultaneously, the change in the lower comatic aberration becomes too large due to the zooming operation. Furthermore, since the Petzval's sum takes an excessively large negative value, the astigmatism and the field curvature are generated excessively.

If the condition exceeds the lower limit of condition (8), the change in the field curvature is enlarged due to the zooming operation, causing the lower comatic aberration to be changed excessively. Furthermore, the spherical aberration cannot be satisfactorily compensated at the telephoto end. If the condition exceeds the upper limit of condition (8), the change in the field curvature is enlarged due to the zooming operation, causing the change in the lower comatic aberration to be enlarged. Furthermore, the spherical aberration at the telephoto end is compensated excessively.

It is assumed that the curvature radius of the positive lens, which confronts the object, of the third lens group positioned most closely to the image is $r_a$ and it is assumed that the curvature radius of the positive lens, which confronts the image, of the third lens group positioned most closely to the image is $r_b$, it is preferable that the following relationship be met:

$$-5 \leq \frac{r_b + r_a}{r_b - r_a} \leq -1 \tag{9}$$

Condition (9) defines the most suitable shape of the positive lens positioned most closer to the image among the third lens group $G_3$. As shown in FIGS. 1A and 1B, the third lens group $G_3$ is positioned closer to the fourth lens group $G_4$ at the wide angle end. It effectively acts to compensate the spherical aberration without deteriorating the lower comatic aberration and the field curvature. Furthermore, it is positioned closer to the second lens group $G_2$ at the telephoto end (FIG. 1B) while acting to effectively compensate the spherical aberration without deterioration in the lower comatic aberration and the field curvature. In order to satisfactorily obtain the above-described compensation effect, the positive lens shape positioned so as to confront the image must be provided in the third lens groups as described above.

If the condition exceeds the lower limit of condition (9), the spherical aberration cannot be satisfactorily compensated, causing the lower comatic aberration to be changed in the direction of the positive values. If the above-described aberrations are compensated by the other lens group or the other lens, the change in the comatic aberration due to the spherical aberration or the zooming operation is excessive increased. If the condition exceeds the upper limit of condition (9), the spherical aberration is excessively compensated, causing the lower comatic aberration to be changed in the direction of the negative values. If the above-described aberration is compensated by the other lens group or the other lens, the change in the comatic aberration due to the spherical aberration or the zooming operation is, similarly to the case where the condition exceeds the lower limit, increased excessively.

It is preferable that a laminated lens of a negative lens and a positive lens be positioned in the fourth lens group $G_4$ and the following conditions be met in this case:

$$0.1 \leq n_{4n} - n_4 \leq 0.5 \quad \ldots (10)$$

where
- $n_{4n}$: the refraction ratio of the negative lens of the laminated lens in the fourth lens group $G_4$ with respect to line d
- $n_{4p}$: the refraction ratio of the positive lens of the laminated lens in the fourth lens group $G_4$ with respect to line d If the condition exceeds the lower limit of condition (10), the value of the Petzval's sum takes an excessively large negative value. As a result, the astigmatism cannot be easily compensated and the spherical aberration cannot also easily be compensated. If the condition exceeds the upper limit of condition (10), the Petzval's sum takes an excessive positive value. As a result, the astigmatism cannot be easily compensated, and the spherical aberration cannot also easily be compensated.

In order to further assuredly reduce the overall size and the overall cost, it is preferable that the first lens group $G_1$ comprises a positive lens and a laminated lens consisting of a negative lens and a positive lens. Furthermore, it is preferable that the second lens group $G_2$ comprises one or more positive lens and a negative lens and the third lens group $G_3$ comprises a positive lens. In addition, it is preferable that the fourth lens group $G_4$ comprises a laminated lens consisting of a positive lens and a negative lens and the fifth lens group $G_5$ comprises one or more positive lens and a negative lens.

FIGS. 3A, 3B and 3C to FIGS. 8A, 8B and 8C respectively illustrate the structure of the lens and the optical passage of a first to sixth embodiments of the present invention.

As shown in FIG. 3A, the first embodiment is arranged in such a manner that the first lens group $G_1$ comprises, when viewed from the object, a positive lens $L_{11}$ the convex side of which confronts the object, a negative meniscus lens $L_{12}$ the convex side of which confronts the object and a positive lens $L_{13}$ laminated to the negative meniscus lens $L_{12}$ which is arranged in such a manner that its stronger curvature side confronts the object. The second lens group $G_2$ comprise a negative lens $L_{21}$ of a double concave shape, a positive lens $L_{22}$ laminated to the negative lens $L_{21}$ and arranged in such a manner that its stronger curvature side confronts the object and a negative lens $L_{23}$ the concave side of which confronts the object. The third lens group comprises a positive lens $L_{31}$ the convex side of which confronts the image. The fourth lens group $G_4$ comprises a positive lens $L_{41}$ of a double convex shape and a negative lens laminated to the positive lens $L_{41}$ and arranged in such a manner that its concave side confront the object. The fifth lens group $G_5$ comprises a positive lens $L_{51}$ arranged in such a manner that the stronger curvature side confronts the image and a negative lens $L_{52}$ laminated to the positive lens $L_{51}$ and arranged to be a double concave shape.

The second to the sixth embodiments respectively shown in FIGS. 4 to 8 are arranged to have the same lens shape as that according to the first embodiment except for the second lens group $G_2$ which is constituted by the negative lens $L_{21}$ of the double concave shape and the positive lens $L_{22}$ the stronger curvature side of which confronts the object. The fifth embodiment shown in FIG. 7 is arranged in such a manner that the fifth lens group $G_5$ is constituted by the positive lens $L_{51}$ the stronger curvature side of which confronts the image and the negative lens $L_{52}$ of the double concave shape, the lenses $L_{51}$ and $L_{52}$ being disposed away from each other.

According to the first, second, third, fourth and the fifth embodiments shown in FIGS. 3 to 7, a diaphragm S is disposed between the second lens group $G_2$ and the third lens group $G_3$. According to the sixth embodiment shown in FIG. 8, the diaphragm S is disposed between the fourth lens group $G_4$ and the fifth lens group $G_5$.

Each of the embodiments is arranged to operate, at the time of the zooming operation performed from the wide angle end to the telephoto end, in such a manner that the air interval between the second lens group $G_2$ and the third lens group $G_3$ is shortened while enlarging the air interval between the first lens group $G_1$ and the second lens group $G_2$. Furthermore, the air interval between the fourth lens group $G_4$ and the fifth lens group $G_5$ is shortened while enlarging the air interval between the third lens group $G_3$ and the fourth lens group $G_4$. That is, the second lens group $G_2$ is moved toward the image while moving the first lens group $G_1$ toward the object in a state where the fourth lens group $G_4$ is fixed to the image surface. Furthermore, the fifth lens group $G_5$ is moved toward the object while moving the third lens group $G_3$ toward the object.

According to each of the above-described embodiments, the fourth lens group $G_4$ is fixed at a position with respect to the position of the image surface at the time of the zooming operation in order to advantageously perform the movement in terms of the cost reduction. However, if the structure is arranged in such a manner that the air interval between the fourth lens group $G_4$ and the fifth lens group $G_5$ is shortened while enlarging the air interval between the third lens group $G_3$ and the fourth lens group $G_4$, the necessity of fixing the fourth lens group $G_3$ can be eliminated. The above-described fixed lens group (the fourth lens group $G_4$) may be moved. Although the route of the movement of each of the groups at the time of the power variation is arranged to be a linear route and a non-linear route. However, if the air interval between the lens group is changed as described above, the above-described movement route can, of course, be changed from the linear route to the non-linear route or from the non-linear route to the linear route.

Then, dimensions and specifications of the first to the sixth embodiments of the present invention are shown in Tables. 1 to 6. The left figures in each of the tables denote the sequential order counted from the object, symbol r denotes the curvature radius of the lens and d represents the lens thickness and the interval between the lens surfaces. Abbe's number and the refraction rate n are the values with respect to line d ($\lambda=587.6$ nm). Furthermore, symbol ds denotes the distance from the apex of the lens surface of the second lens group which is most adjacent to the image to the diaphragm S according to the first to fifth embodiments of the present invention. The symbol $d_s$ denotes, according to the sixth embodiment, the distance from the apex of the lens surface of the fourth lens group which is most adjacent to the image to the diaphragm S.

TABLE 1

(First Embodiment)
Focal distance f: 80 to 200, F-number: 4.6
Field Angle: 30.4° to 11.8°

| | r | d | Abbe | n |
|---|---|---|---|---|
| 1 | 110.672 | 3.50 | 64.1 | 1.51680 |
| 2 | 218.033 | 0.10 | | |
| 3 | 69.139 | 2.40 | 25.4 · | 1.80518 |
| 4 | 44.750 | 7.80 | 64.1 | 1.51680 |
| 5 | −645.765 | (variable) | | |
| 6 | −76.596 | 1.60 | 50.7 | 1.69350 |
| 7 | 41.745 | 3.50 | 25.4 | 1.80518 |
| 8 | 155.995 | 2.00 | | |
| 9 | −87.570 | 1.60 | 55.6 | 1.69680 |
| 10 | −695.191 | (variable) | | |
| 11 | −840.520 | 3.43 | 58.5 | 1.61272 |
| 12 | −48.249 | (variable) | | |
| 13 | 42.000 | 5.50 | 57.0 | 1.62280 |
| 14 | −38.235 | 1.70 | 25.4 | 1.80518 |
| 15 | −343.786 | (variable) | | |
| 16 | 106.734 | 4.00 | 35.2 | 1.74950 |
| 17 | −35.000 | 2.00 | 53.9 | 1.71300 |
| 18 | 28.115 | (Bf) | | |
| f | 80.0000 | 105.0000 | | 199.9998 |
| d5 | 2.3789 | 16.8784 | | 48.5939 |
| d10 | 35.9129 | 25.6780 | | 5.1028 |

TABLE 1-continued

(First Embodiment)

Focal distance f: 80 to 200, F-number: 4.6
Field Angle: 30.4° to 11.8°

| | | | |
|---|---|---|---|
| d12 | 2.1079 | 6.3724 | 17.5129 |
| d15 | 20.8928 | 18.4686 | 0.4731 |
| Bf | 46.4329 | 48.8571 | 66.8526 |
| ds | 33.3156 | 23.0807 | 2.5055 |

TABLE 2

(Second Embodiment)

Focal distance f: 102 to 292, F-number: 5.7
Field Angle: 23.6° to 8.2°

| | r | d | Abbe | n |
|---|---|---|---|---|
| 1 | 110.997 | 3.50 | 49.0 | 1.53172 |
| 2 | 294.483 | 0.10 | | |
| 3 | 70.166 | 2.00 | 23.0 | 1.86074 |
| 4 | 46.387 | 9.50 | 54.6 | 1.51454 |
| 5 | −3821.326 | (variable) | | |
| 6 | −75.691 | 1.80 | 45.4 | 1.79668 |
| 7 | 33.777 | 1.80 | | |
| 8 | 36.790 | 3.70 | 27.6 | 1.75520 |
| 9 | 373.799 | (variable) | | |
| 10 | −121.678 | 3.00 | 70.4 | 1.48749 |
| 11 | −36.806 | (variable) | | |
| 12 | 45.927 | 4.50 | 82.5 | 1.49782 |
| 13 | −37.210 | 1.50 | 33.9 | 1.80384 |
| 14 | −108.341 | (variable) | | |
| 15 | −483.083 | 2.70 | 26.1 | 1.78470 |
| 16 | −46.198 | 1.80 | 53.9 | 1.71300 |
| 17 | 35.955 | (Bf) | | |

| f | 102.0011 | 199.9884 | 292.0030 |
|---|---|---|---|
| d5 | 2.0772 | 39.1733 | 59.3988 |
| d9 | 42.7123 | 18.5488 | 4.8410 |
| d11 | 1.2855 | 14.2334 | 20.7357 |
| d14 | 38.5035 | 20.5855 | 1.5779 |
| Bf | 41.1257 | 59.0280 | 78.0509 |
| ds | 40.0624 | 15.8989 | 2.1911 |

TABLE 3

(Third Embodiment)

Focal distance f: 102 to 292, f-number: 4.6 to 5.7
Field Angle: 24.0° to 8.2°

| | r | d | Abbe | n |
|---|---|---|---|---|
| 1 | 99.713 | 4.00 | 64.1 | 1.51680 |
| 2 | 225.037 | 0.10 | | |
| 3 | 67.093 | 2.50 | 23.0 | 1.86074 |
| 4 | 45.153 | 10.50 | 54.6 | 1.51454 |
| 5 | 15051.901 | (variable) | | |
| 6 | −89.484 | 1.80 | 49.4 | 1.77279 |
| 7 | 38.204 | 2.70 | | |
| 8 | 42.772 | 4.30 | 27.6 | 1.75520 |
| 9 | 207.568 | (variable) | | |
| 10 | −297.330 | 4.20 | 82.5 | 1.49782 |
| 11 | −46.336 | (variable) | | |
| 12 | 48.606 | 5.15 | 64.1 | 1.51680 |
| 13 | −45.148 | 1.50 | 28.6 | 1.79504 |
| 14 | −143.792 | (variable) | | |
| 15 | −225.706 | 3.00 | 25.5 | 1.80458 |
| 16 | −35.303 | 1.80 | 45.4 | 1.79668 |
| 17 | 47.108 | (Bf) | | |

| f | 102.0002 | 199.9998 | 291.9997 |
|---|---|---|---|
| d5 | 2.3471 | 31.7951 | 46.1143 |
| d9 | 49.4948 | 20.0467 | 5.7275 |
| d11 | 1.8983 | 25.4568 | 39.3063 |
| d14 | 36.5889 | 18.9029 | 1.5223 |
| Bf | 39.9426 | 57.6284 | 75.0089 |
| ds | 46.2948 | 16.8467 | 2.5275 |

TABLE 4

(Fourth Embodiment)

Focal distance f: 102 to 388, F-number: 5.7 to 8.0
Field Angle: 23.8° to 6.2°

| | r | d | Abbe | n |
|---|---|---|---|---|
| 1 | 76.053 | 4.00 | 54.6 | 1.51454 |
| 2 | 273.365 | 0.10 | | |
| 3 | 79.449 | 1.60 | 35.7 | 1.90265 |
| 4 | 47.968 | 7.50 | 82.5 | 1.49782 |
| 5 | 611.314 | (variable) | | |
| 6 | −75.740 | 1.50 | 43.3 | 1.84042 |
| 7 | 37.159 | 1.80 | | |
| 8 | 38.932 | 3.50 | 27.8 | 1.69911 |
| 9 | −1850.633 | (variable) | | |
| 10 | −143.797 | 3.00 | 82.5 | 1.49782 |
| 11 | −40.716 | (variable) | | |
| 12 | 45.004 | 4.50 | 82.5 | 1.49782 |
| 13 | −46.200 | 1.30 | 35.7 | 1.90265 |
| 14 | −133.998 | (variable) | | |
| 15 | −355.098 | 2.35 | 25.5 | 1.73038 |
| 16 | −42.542 | 1.30 | 52.3 | 1.74810 |
| 17 | 40.938 | (Bf) | | |

| f | 102.0047 | 250.0017 | 387.9986 |
|---|---|---|---|
| d5 | 2.1439 | 51.4283 | 77.1678 |
| d9 | 53.9750 | 19.6458 | 8.9607 |
| d11 | 1.7434 | 20.7774 | 21.7498 |
| d14 | 48.2818 | 25.3248 | 0.5598 |
| Bf | 37.4736 | 60.4301 | 85.1945 |
| ds | 51.9750 | 17.6459 | 6.9607 |

TABLE 5

(Fifth Embodiment)

Focal distance f: 204 to 588, F-number: 5.7 to 8.0
Field Angle: 12.0° to 4.2°

| | r | d | Abbe | n |
|---|---|---|---|---|
| 1 | 553.910 | 4.00 | 45.9 | 1.54814 |
| 2 | −1179.705 | 0.20 | | |
| 3 | 108.444 | 3.00 | 25.5 | 1.80458 |
| 4 | 75.675 | 11.00 | 82.5 | 1.49782 |
| 5 | 1809.705 | (variable) | | |
| 6 | −191.100 | 2.50 | 52.3 | 1.74810 |
| 7 | 64.006 | 4.00 | | |
| 8 | 70.449 | 6.00 | 27.8 | 1.69911 |
| 9 | 316.273 | (variable) | | |
| 10 | −960.473 | 5.00 | 82.5 | 1.49782 |
| 11 | −90.369 | (variable) | | |
| 12 | 96.107 | 7.50 | 70.4 | 1.48749 |
| 13 | −73.565 | 2.00 | 28.6 | 1.79504 |
| 14 | −172.530 | (variable) | | |
| 15 | 461.565 | 3.50 | 25.5 | 1.73038 |
| 16 | −52.207 | 1.40 | | |
| 17 | −51.990 | 2.00 | 39.8 | 1.86994 |
| 18 | 67.671 | (Bf) | | |

| f | 204.0165 | 400.0025 | 588.0043 |
|---|---|---|---|
| d5 | 2.8635 | 56.5702 | 80.2283 |
| d9 | 99.7316 | 38.6171 | 9.4726 |
| d11 | 1.4970 | 45.9439 | 78.8618 |
| d14 | 66.6878 | 37.2231 | 6.6014 |
| Bf | 85.2559 | 114.7210 | 145.3431 |
| ds | 96.5316 | 35.4171 | 6.2726 |

TABLE 6

(Sixth Embodiment)

Focal distance f: 204 to 585, F-number: 5.7
Field Angle: 12.0° to 4.2°

| | r | d | Abbe | n |
|---|---|---|---|---|
| 1 | 747.377 | 6.00 | 45.9 | 1.54814 |
| 2 | −1473.962 | 0.20 | | |
| 3 | 129.752 | 4.00 | 25.5 | 1.80458 |
| 4 | 90.902 | 17.60 | 82.5 | 1.49782 |
| 5 | −4432.360 | (variable) | | |
| 6 | −171.026 | 3.60 | 52.3 | 1.74810 |
| 7 | 74.655 | 4.10 | | |

TABLE 6-continued (Sixth Embodiment)
Focal distance f: 204 to 585, F-number: 5.7
Field Angle: 12.0° to 4.2°

| | | | | |
|---|---|---|---|---|
| 8 | 80.571 | 7.00 | 27.8 | 1.69911 |
| 9 | 440.540 | (variable) | | |
| 10 | −989.301 | 7.00 | 82.5 | 1.49782 |
| 11 | −98.573 | (variable) | | |
| 12 | 108.265 | 7.50 | 70.4 | 1.48749 |
| 13 | −82.425 | 3.00 | 28.6 | 1.79504 |
| 14 | −189.936 | (variable) | | |
| 15 | 711.702 | 4.50 | 25.5 | 1.80458 |
| 16 | −77.649 | 4.00 | 40.9 | 1.79631 |
| 17 | 71.724 | (Bf) | | |

| f | 204.0103 | 400.0025 | 585.0035 |
|---|---|---|---|
| d5 | 9.3357 | 68.1754 | 93.4110 |
| d9 | 101.8839 | 43.0442 | 17.8086 |
| d11 | 1.1095 | 50.1426 | 85.1848 |
| d14 | 75.1643 | 38.5559 | 3.2212 |
| Bf | 83.3343 | 119.9431 | 155.2781 |
| ds | 73.6643 | 37.0559 | 1.7213 |

According to the power varying method according to the present invention, the degree of freedom in compensating the aberration performed in each of the lens groups can be significantly improved. Therefore, an excellent imaging performance can be obtained from the wide angle end to the telephoto end while realizing a high variable power ratio and significantly reducing the number of the component lenses and the overall size.

Then, the values corresponding to the above-described conditions are shown in Table 7.

TABLE 7

(Values corresponding to the conditions)

| Embodiments | $\frac{D_{3T} - D_{3W}}{f_W}$ | $\frac{f_{23}}{f_{25}}$ | $\frac{f_{45}}{f_{25}}$ | $\frac{f_3}{f_W}$ | $\frac{f_4}{f_W}$ | $\frac{f_5}{f_W}$ |
|---|---|---|---|---|---|---|
| 1 | 0.19 | 1.7 | 3.9 | 1.04 | 1.00 | −0.75 |
| 2 | 0.19 | 4.4 | 1.7 | 1.05 | 0.98 | −0.49 |
| 3 | 0.37 | 5.7 | 1.7 | 1.08 | 0.98 | −0.48 |
| 4 | 0.20 | 5.7 | 1.7 | 1.11 | 1.08 | −0.47 |
| 5 | 0.38 | 6.8 | 1.6 | 0.98 | 0.89 | −0.37 |
| 6 | 0.41 | 5.7 | 1.7 | 1.08 | 0.99 | −0.50 |

| Embodiments | $\frac{f_1}{f_W}$ | $\frac{f_2}{f_W}$ | $\frac{r_b + r_a}{r_b - r_a}$ | $n_{4n} - n_{4p}$ |
|---|---|---|---|---|
| 1 | 1.50 | −0.66 | −1.12 | 0.18 |
| 2 | 1.23 | −0.67 | −1.87 | 0.31 |
| 3 | 1.20 | −0.71 | −1.37 | 0.28 |
| 4 | 1.37 | −0.69 | −1.79 | 0.40 |
| 5 | 1.06 | −0.66 | −1.21 | 0.31 |
| 6 | 1.20 | −0.71 | −1.22 | 0.31 |

Although the spherical lenses are employed in the above-described embodiments, the number of the component lenses can, of course, be reduced by employed aspherical lenses.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. A telephoto zoom lens, when viewed from the object, comprises:
   a first lens group having positive refracting power;
   a second lens group having negative refracting power;
   a third lens group having positive refracting power;
   fourth lens group having positive retracting power; and
   a fifth lens group having negative refracting power,
   wherein, when magnification is varied from the wide angle end to the telephoto end, an air interval between said first lens group and said second lens group is enlarged, an air interval between said second lens group and said third lens group is reduced, an air interval between said third lens group and said fourth lens group is enlarged and an air interval between said fourth lens group and said fifth lens group is reduced; and
   wherein, assuming than that the focal distance of the overall system at said wide angle end is $f_W$, the air inteal from the apex of the lens surface of said third lens group $G_3$ which is most adjacent to the image at said telephoto end to the apex of the lens surface of said fourth lens group $G_4$ which is most adjacent to said object is $D_{3T}$ and the air interval from the apex of the lens surface of said third lens group $G_3$ which is most adjacent to said image at said wide angle end to the apex of the lens surface of said fourth lens group $G_4$ which is most adjacent to said object is $D_{3W}$, said third lens group and said fourth lens group are constituted so as to meet the following relationship:

$$0 < \frac{D_{3T} - D_{3W}}{f_W} \leq 2.$$

2. A telephoto zoom lens according to claim 1, wherein, assuming that the synthesized focal distance of said second lens group and said third lens group at said telephoto end is $f_{23}$ and the synthesized focal distance of said fourth lens group and said fifth lens group is $f_{45}$, said second to fifth lens groups are constituted in such a manner that their synthesized focal distance meets the following conditions:

$f_{23} < 0, f_{45} < 0,$

3. A telephoto zoom lens according to claim 1, wherein, assuming that the synthesized focal distance of said second lens group and said third lens group at said telephoto end is $f_{23}$, the synthesized focal distance of said fourth lens group and said fifth lens group is $f_{45}$ and the synthesized focal distance of said second lens group, said third lens group, said fourth lens group and said fifth lens group is $f_{25}$, said second to said fifth lens groups are constituted so as to meet the following conditions:

$$1 < \frac{f_{23}}{f_{25}} \leq 15, 1 < \frac{f_{45}}{f_{25}} \leq 10,$$

$f_{23} < 0, f_{25} < 0, f_{45} < 0.$

4. A telephoto zoom lens according to claim 3, wherein the synthesized focal distance $f_{23}$ of said second lens group and said third lens group at said telephoto end and the synthesized focal distance $f_{45}$ of said fourth lens group and said fifth lens group are constituted so as meet the following conditions:

$$1 < \frac{f_{23}}{f_{25}} \leq 10, 1 < \frac{f_{45}}{f_{25}} \leq 7.$$

5. A telephoto zoom lens according to claim 1, wherein, assuming that the focal distance of the overall system at said wide angle end is $f_W$, the focal distance of said third lens group is $f_3$, the focal distance of said fourth lens group is $f_4$ and the focal distance of said fifth lens group is $f_5$, said third, fourth and fifth lens groups are constituted so as to meet the following conditions:

$$0.7 \leq \frac{f_3}{f_W} \leq 1.5, \quad 0.6 \leq \frac{f_4}{f_W} \leq 1.5,$$

$$-1.1 \leq \frac{f_5}{f_W} \leq -0.2.$$

6. A telephoto zoom lens according to claim 5, wherein, assuming that the focal distance of the overall system at said wide angle end is $f_W$, the focal distance of said first lens group is $f_1$ and the focal distance of said second lens group is $f_2$, said first and second lens groups are constituted so as to meet the following conditions:

$$0.6 \leq \frac{f_1}{f_W} \leq 1.9$$

$$-0.9 \leq \frac{f_2}{f_W} \leq -0.4.$$

7. A telephoto zoom lens according to claim 1, wherein said third lens group includes a positive lens positioned most adjacent to said image and, assuming that the curvature radius of the lens surface of said positive lens adjacent to an object is $r_a$ and the curvature radius of the lens surface adjacent to said image is $r_b$, it is constituted so as to meet the following condition:

$$-5 \leq \frac{r_b + r_a}{r_b - r_a} \leq -1.$$

8. A telephoto zoom lens according to claim 1, wherein, said fourth lens group includes a laminated lens consisting of a negative lens and a positive lens laminated to each other and, assuming that the refraction rate of said negative lens in said laminated lens with respect to line d is $n_{4n}$ and the refraction rate of said positive lens with respect to said line d is $n_{4p}$, it is constituted so as to meet the following condition.

$$0.1 \leq n_{4n} - n_{4p} \leq 0.5$$

9. A telephoto zoom lens according to claim 1, wherein the following numerical data are provided:

| Focal distance f: 80 to 200, F-number: 4.6 Field Angle: 30.4° to 11.8° | | | |
|---|---|---|---|
| r | d | Abbe | n |
| 1 | 110.672 | 3.50 | 64.1 | 1.51680 |
| 2 | 218.033 | 0.10 | | |
| 3 | 69.139 | 2.40 | 25.4 | 1.80518 |
| 4 | 44.750 | 7.80 | 64.1 | 1.51680 |
| 5 | −645.765 | (variable) | | |
| 6 | −76.596 | 1.60 | 50.7 | 1.69350 |
| 7 | 41.745 | 3.50 | 25.4 | 1.80518 |
| 8 | 155.995 | 2.00 | | |
| 9 | −87.570 | 1.60 | 55.6 | 1.69680 |
| 10 | −695.191 | (variable) | | |
| 11 | −840.520 | 3.43 | 58.5 | 1.61272 |
| 12 | −48.249 | (variable) | | |
| 13 | 42.000 | 5.50 | 57.0 | 1.62280 |
| 14 | −38.235 | 1.70 | 25.4 | 1.80518 |

-continued

| Focal distance f: 80 to 200, F-number: 4.6 Field Angle: 30.4° to 11.8° | | | |
|---|---|---|---|
| 15 | −343.786 | (variable) | | |
| 16 | 106.734 | 4.00 | 35.2 | 1.74950 |
| 17 | −35.000 | 2.00 | 53.9 | 1.71300 |
| 18 | 28.115 | (Bf) | | |
| f | 80.0000 | 105.0000 | 199.9998 | |
| d5 | 2.3789 | 16.8784 | 48.5939 | |
| d10 | 35.9129 | 25.6780 | 5.1028 | |
| d12 | 2.1079 | 6.3724 | 17.5129 | |
| d15 | 20.8928 | 18.4686 | 0.4731 | |
| Bf | 46.4329 | 48.8571 | 66.8526 | |
| ds | 33.3156 | 23.0807 | 2.5055 | | where r denotes curvature radius of the lens, d denotes the thickness of the lens and the interval between lens surfaces, n denotes the refraction rate, the Abbe's number and the refraction rate n are the values with respect to line d, symbol ds denotes the distance from the apex of the lens surface of said second lens group which is most adjacent to said image to the diaphragm.

10. A telephoto zoom lens according to claim 1, wherein the following numerical data are provided:

| Focal distance f: 102 to 292, F-number: 5.7 Field Angle: 23.6° to 8.2° | | | |
|---|---|---|---|
| | r | d | Abbe | n |
| 1 | 110.997 | 3.50 | 49.0 | 1.53172 |
| 2 | 294.483 | 0.10 | | |
| 3 | 70.166 | 2.00 | 23.0 | 1.86074 |
| 4 | 46.387 | 9.50 | 54.6 | 1.51454 |
| 5 | −3821.326 | (variable) | | |
| 6 | −75.691 | 1.80 | 45.4 | 1.79668 |
| 7 | 33.777 | 1.80 | | |
| 8 | 36.790 | 3.70 | 27.6 | 1.75520 |
| 9 | 373.799 | (variable) | | |
| 10 | −121.678 | 3.00 | 70.4 | 1.48749 |
| 11 | −36.806 | (variable) | | |
| 12 | 45.927 | 4.50 | 82.5 | 1.49782 |
| 13 | −37.210 | 1.50 | 33.9 | 1.80384 |
| 14 | −108.341 | (variable) | | |
| 15 | −483.083 | 2.70 | 26.1 | 1.78470 |
| 16 | −46.198 | 1.80 | 53.9 | 1.71300 |
| 17 | 35.955 | (Bf) | | |
| f | 102.0011 | 199.9884 | 292.0030 | |
| d5 | 2.0772 | 39.1733 | 59.3988 | |
| d9 | 42.7123 | 18.5488 | 4.8410 | |
| d11 | 1.2855 | 14.2334 | 20.7357 | |
| d14 | 38.5035 | 20.5855 | 1.5779 | |
| Bf | 41.1257 | 59.0280 | 78.0509 | |
| ds | 40.0624 | 15.8989 | 2.1911 | | where r denotes curvature radius of the lens, d denotes the thickness of the lens and the interval between lens surfaces, n denotes the refraction ate, the Abbe's number and the refraction rate n are the values with respect to line d, symbol ds denotes the distance from the apex of the lens surface of said second lens group which is most adjacent to said image to the diaphragm.

11. A telephoto zoom lens according to claim 1, wherein the following numerical data are provided:

| Focal distance f: 102 to 292, F-number: 4.6 to 5.7 Field Angle: 24.0° to 8.2° | | | |
|---|---|---|---|
| | r | d | Abbe | n |
| 1 | 99.713 | 4.00 | 64.1 | 1.51680 |
| 2 | 225.037 | 0.10 | | |
| 3 | 67.093 | 2.50 | 23.0 | 1.86074 |
| 4 | 45.153 | 10.50 | 54.6 | 1.51454 |

-continued

Focal distance f: 102 to 292, F-number: 4.6 to 5.7
Field Angle: 24.0° to 8.2°

| | r | d | Abbe | n |
|---|---|---|---|---|
| 5 | 15051.901 | (variable) | | |
| 6 | −89.484 | 1.80 | 49.4 | 1.77279 |
| 7 | 38.204 | 2.70 | | |
| 8 | 42.772 | 4.30 | 27.6 | 1.75520 |
| 9 | 207.568 | (variable) | | |
| 10 | −297.330 | 4.20 | 82.5 | 1.49782 |
| 11 | −46.336 | (variable) | | |
| 12 | 48.606 | 5.15 | 64.1 | 1.51680 |
| 13 | −45.148 | 1.50 | 28.6 | 1.79504 |
| 14 | −143.792 | (variable) | | |
| 15 | −225.706 | 3.00 | 25.5 | 1.80458 |
| 16 | −35.303 | 1.80 | 45.4 | 1.79668 |
| 17 | 47.108 | (Bf) | | |

| f | 102.0002 | 199.9998 | 291.9997 |
|---|---|---|---|
| d5 | 2.3471 | 31.7951 | 46.1143 |
| d9 | 49.4948 | 20.0467 | 5.7275 |
| d11 | 1.8983 | 25.4568 | 39.3063 |
| d14 | 36.5889 | 18.9029 | 1.5223 |
| Bf | 39.9426 | 57.6284 | 75.0089 |
| ds | 46.2948 | 16.8467 | 2.5275 | where r denotes curvature radius of the lens, d denotes the thickness of the lens and the interval between lens surfaces, n denotes the refraction rate, the Abbe's number and the refraction rate n are the values with respect to lin d, symbol ds denotes the distance from the apex of the lens surface of said second lens group which is most adjacent to said image to the diaphragm.

12. A telephoto zoom lens according to claim 1, wherein the following numerical data are provided:

Focal distance f: 102 to 388, F-number: 5.7 to 8.0
Field Angle: 23.8° to 6.2°

| | r | d | Abbe | n |
|---|---|---|---|---|
| 1 | 76.053 | 4.00 | 54.6 | 1.51454 |
| 2 | 273.365 | 0.10 | | |
| 3 | 79.449 | 1.60 | 35.7 | 1.90265 |
| 4 | 47.968 | 7.50 | 82.5 | 1.49782 |
| 5 | 611.314 | (variable) | | |
| 6 | −75.740 | 1.50 | 43.3 | 1.84042 |
| 7 | 37.159 | 1.80 | | |
| 8 | 38.932 | 3.50 | 27.8 | 1.69911 |
| 9 | −1850.633 | (variable) | | |
| 10 | −143.797 | 3.00 | 82.5 | 1.49782 |
| 11 | −40.716 | (variable) | | |
| 12 | 45.004 | 4.50 | 82.5 | 1.49782 |
| 13 | −46.200 | 1.30 | 35.7 | 1.90265 |
| 14 | −133.998 | (variable) | | |
| 15 | −355.098 | 2.35 | 25.5 | 1.73038 |
| 16 | −42.542 | 1.30 | 52.3 | 1.74810 |
| 17 | 40.938 | (Bf) | | |

| f | 102.0047 | 250.0017 | 387.9986 |
|---|---|---|---|
| d5 | 2.1439 | 51.4283 | 77.1678 |
| d9 | 53.9750 | 19.6458 | 8.9607 |
| d11 | 1.7434 | 20.7774 | 21.7498 |
| d14 | 48.2818 | 25.3248 | 0.5598 |
| Bf | 37.4736 | 60.4301 | 85.1945 |
| ds | 51.9750 | 17.6459 | 6.9607 | where rr denotes curvature radius of the lens, d denotes the thickness of the lens and the interval between lens surfaces, n denotes the refraction ate, the Abbe's number and the refraction rate n are the values with respect to line d, symbol ds denotes the distance from the apex of the lens surface of said second lens group which is most adjacent to said image to the diaphragm.

13. A telephoto zoom lens according to claim 1, wherein the following numerical data are provided:

Focal distance f: 204 to 588, F-number: 5.7 to 8.0
Field Angle: 12.0° to 4.2°

| | r | d | Abbe | n |
|---|---|---|---|---|
| 1 | 553.910 | 4.00 | 45.9 | 1.54814 |
| 2 | −1179.705 | 0.20 | | |
| 3 | 108.444 | 3.00 | 25.5 | 1.80458 |
| 4 | 75.675 | 11.00 | 82.5 | 1.49782 |
| 5 | 1809.705 | (variable) | | |
| 6 | −191.100 | 2.50 | 52.3 | 1.74810 |
| 7 | 64.006 | 4.00 | | |
| 8 | 70.449 | 6.00 | 27.8 | 1.69911 |
| 9 | 316.273 | (variable) | | |
| 10 | −906.473 | 5.00 | 82.5 | 1.49782 |
| 11 | −90.369 | (variable) | | |
| 12 | 96.107 | 7.50 | 70.4 | 1.48749 |
| 13 | −73.565 | 2.00 | 28.6 | 1.79504 |
| 14 | −172.530 | (variable) | | |
| 15 | 461.565 | 3.50 | 25.5 | 1.73038 |
| 16 | −52.207 | 1.40 | | |
| 17 | −51.990 | 2.00 | 39.8 | 1.86994 |
| 18 | 67.671 | (Bf) | | |

| f | 204.0165 | 400.0025 | 588.0043 |
|---|---|---|---|
| d5 | 2.8635 | 56.5702 | 80.2283 |
| d9 | 99.7316 | 38.6171 | 9.4726 |
| d11 | 1.4970 | 45.9439 | 78.8618 |
| d14 | 66.6878 | 37.2231 | 6.6014 |
| Bf | 85.2559 | 114.7210 | 145.3431 |
| ds | 96.5316 | 35.4171 | 6.2726 | where r denotes curvature radius of the lens, d denotes the thickness of the lens and the interval between lens surfaces, n denotes the refraction rate, the Abbe's number and the refraction rate n are the values with respect to line d, symbol ds denotes the distance from the apex of the lens surface of said second lens group which is most adjacent to said image to the diaphragm.

14. A telephoto zoom lens according to claim 1, wherein the following numerical data are provided:

Focal distance f: 204 to 585, F-number: 5.7
Field Angle: 12.0° to 4.2°

| | r | d | Abbe | n |
|---|---|---|---|---|
| 1 | 747.377 | 6.00 | 45.9 | 1.54814 |
| 2 | −1473.962 | 0.20 | | |
| 3 | 129.752 | 4.00 | 25.5 | 1.80458 |
| 4 | 90.902 | 17.60 | 82.5 | 1.49782 |
| 5 | −4432.360 | (variable) | | |
| 6 | −171.026 | 3.60 | 52.3 | 1.74810 |
| 7 | 74.655 | 4.10 | | |
| 8 | 80.571 | 7.00 | 27.8 | 1.69911 |
| 9 | 440.540 | (variable) | | |
| 10 | −989.301 | 7.00 | 82.5 | 1.49782 |
| 11 | −98.573 | (variable) | | |
| 12 | 108.265 | 7.50 | 70.4 | 1.48749 |
| 13 | −82.425 | 3.00 | 28.6 | 1.79504 |
| 14 | −189.936 | (variable) | | |
| 15 | 711.702 | 4.50 | 25.5 | 1.80458 |
| 16 | −77.649 | 4.00 | 40.9 | 1.79631 |
| 17 | 71.724 | (Bf) | | |

| f | 204.0103 | 400.0025 | 585.0035 |
|---|---|---|---|
| d5 | 9.3357 | 68.1754 | 93.4110 |
| d9 | 101.8839 | 43.0442 | 17.8086 |
| d11 | 1.1095 | 50.1426 | 85.1848 |
| d14 | 75.1643 | 38.5559 | 3.2212 |
| Bf | 83.3343 | 119.9431 | 155.2781 |
| ds | 73.6643 | 37.0559 | 1.7213 | where r denotes curvature radius of the lens, d denotes the thickness of the lens and the interval between lens surfaces, n denotes the refraction rate, the Abbe's number and the refraction rate n are the values with respect to line d, symbol ds denotes the distance from the apex of the lens surface of the fourth lens group which is most adjacent to the image of the diaphragm.

15. A telephoto zoom lens comprising, in the order from an object side:
    a first lens group having positive refracting power;
    a second lens group having negative refracting power;
    a third lens group having positive refracting power;
    a fourth lens group having positive refracting power;
    a fifth lens group having negative refracting power, said fifth lens group being moved toward the object at the time of the zooming operation performed from the wide angle end to the telephoto end in order to reduce the positive distortion generated at the telephoto end, wherein, when magnification is varied from the wide angle end to telephoto end, an air interval between said first lens group and said second lens group is enlarged, an air interval between said second lens group and said third lens group is reduced, an air interval between said third lens group and aid fourth lens group is enlarged and an air interval between said fourth lens group and said fifth lens group is reduced.

16. A telephoto zoom lens according to claim 15, wherein aid third lens group consists of a positive meniscus lens convex to the image side.

17. A telephoto zoom lens according to claim 16, wherein said positive meniscus lens of said third lens group satisfies the following condition, where the curvature radius of the lens surface of said positive lens adjacent to an object is $r_a$ and the curvature radius of the lens surface adjacent to said image is $r_b$ $$-5 \leq \frac{r_b + r_a}{r_b - r_a} \leq -1.$$

18. A telephoto zoom lens comprising, in the order from an object side:
    a first lens group having positive refracting power;
    a second lens group having negative refracting power;
    a third lens group having positive refracting power;
    a fourth lens group having positive refracting power;
    a fifth lens group having negative refracting power, wherein, when magnification is varied from the wide angle end to the telephoto end, an air interval between said first lens group and said second lens group is enlarged, an air interval between said second lens group and said third lens group is reduced, an air interval between said third lens group and said fourth lens group is enlarged and an air interval between said fourth lens group and said fifth lens group is reduced, and wherein, at the telephoto end, said second lens group and said third lens group from an intermediate negative lens group $G_M$ to compensate the spherical aberration, and said fourth lens group and said fifth lens group form a rearward negative lens group $G_R$ to compensate off-axis aberration.

19. A telephoto zoom lens according to claim 18, wherein said fifth lens group is moved toward the object at the time of the zooming operation performed from the wide angle and to the telephoto end in order to reduce the positive distortion generated at the telephoto end.

* * * * *

UNITED STATES PATENT AND TRADEMARK OFFICE
CERTIFICATE OF CORRECTION

PATENT NO. : 5,126,883
APPLICATION NO. : 07/599893
DATED : June 30, 1992
INVENTOR(S) : Haruo Sato and Yoshinari Hamanishi It is certified that error appears in the above-identified patent and that said Letters Patent is hereby corrected as shown below:

Column 20, line 2, insert --a-- at the beginning of the line.

Column 20, line 14, "than" should read --that--.

Column 20, line 15, "inteal" should read --interval--.

Column 20, line 17, "of" should read --to--.

Column 23, line 59, "rr" should read --r--.

Column 25, line 16, after "to" insert --the--.

Column 25, line 21, "aid" should read --said--.

Column 25, line 25, "aid" should read --said--.

Column 26, line 23, "from" should read --form--.

Signed and Sealed this

Seventeenth Day of April, 2007

JON W. DUDAS
*Director of the United States Patent and Trademark Office*